UNITED STATES PATENT OFFICE.

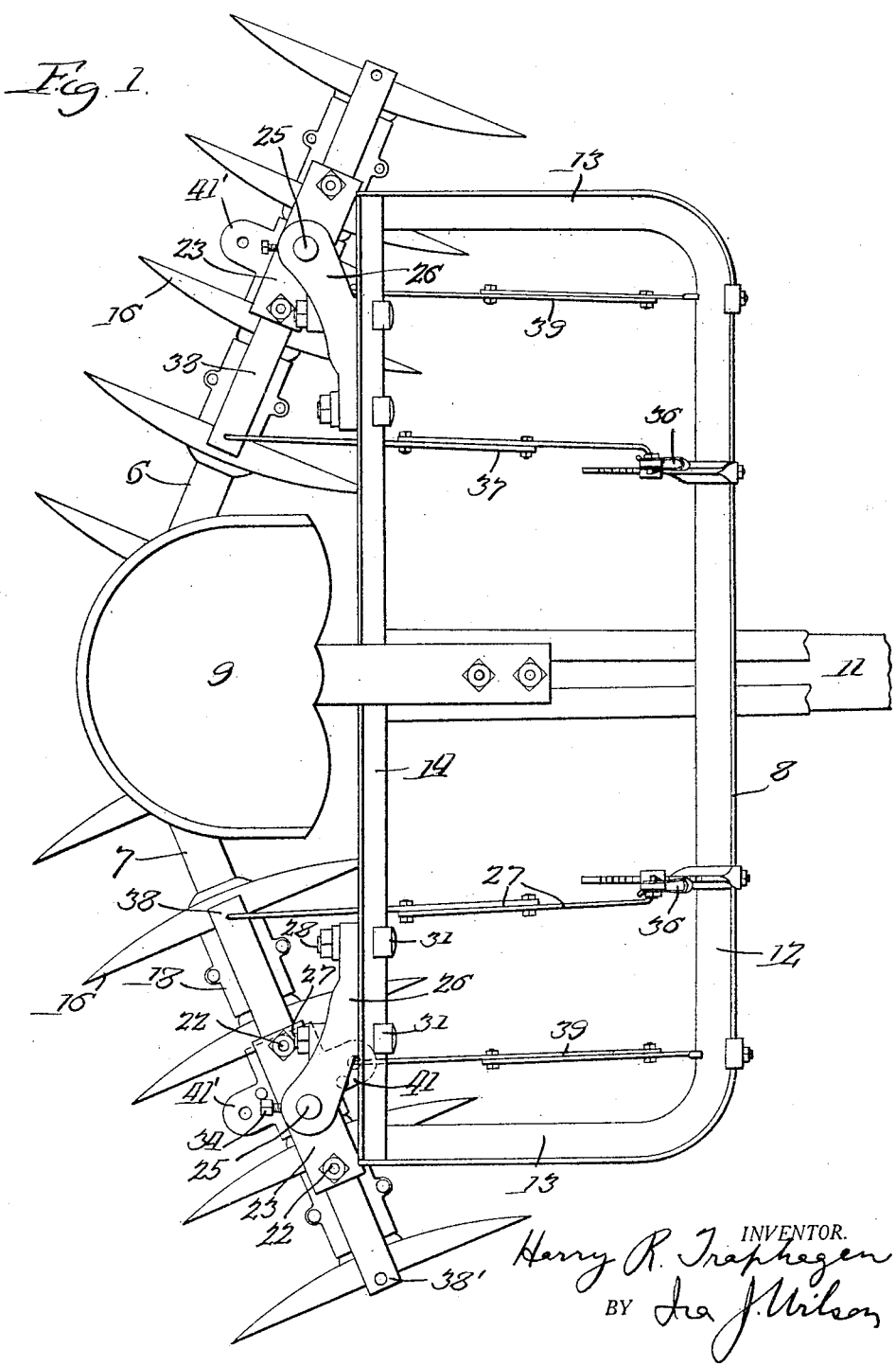

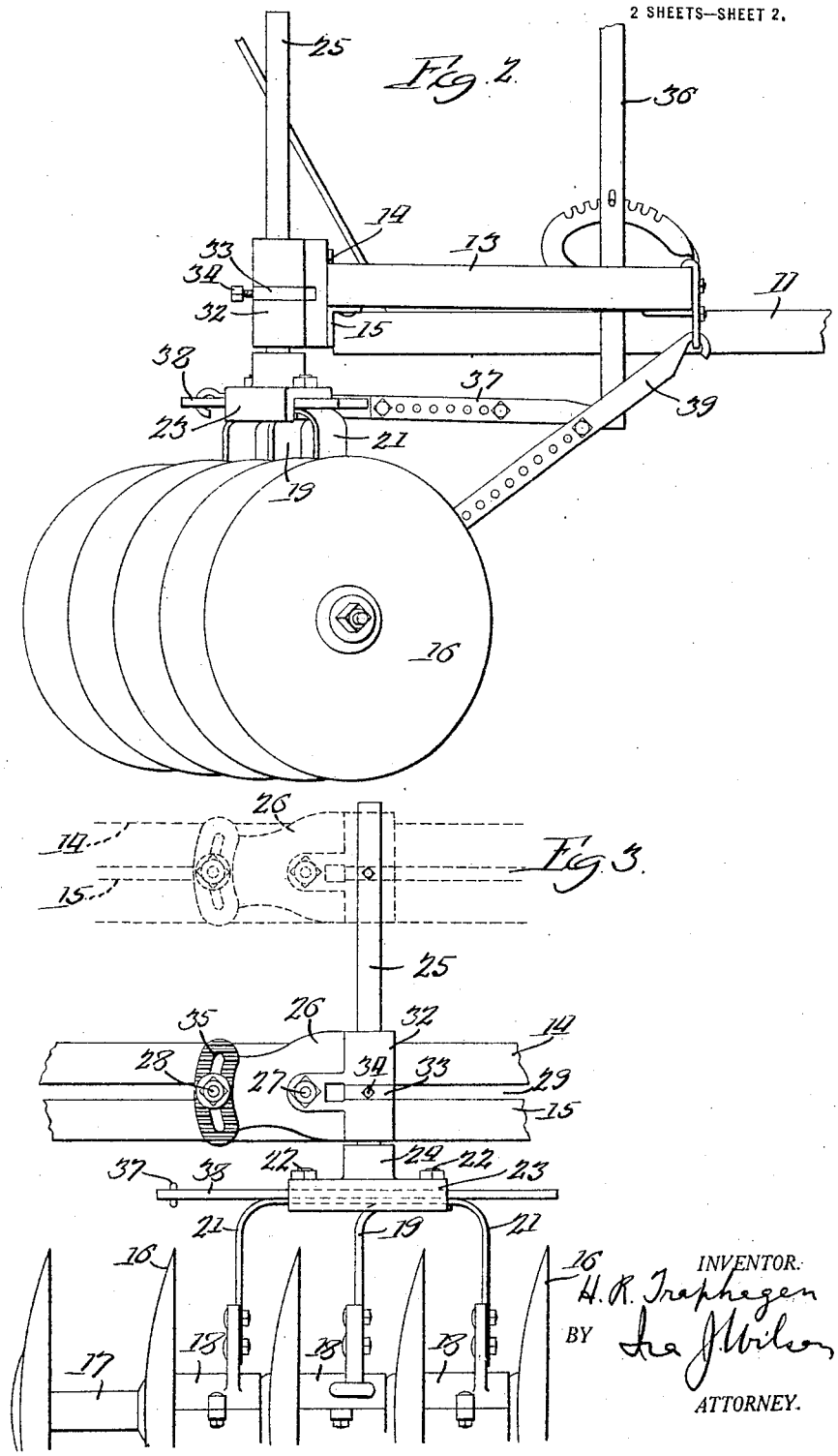

HARRY R. TRAPHAGEN, OF ROCKFORD, ILLINOIS, ASSIGNOR TO EMERSON-BRANTINGHAM COMPANY, OF ROCKFORD, ILLINOIS, A CORPORATION OF ILLINOIS.

REVERSIBLE HARROW.

1,410,144.     Specification of Letters Patent.     Patented Mar. 21, 1922.

Application filed July 8, 1920. Serial No. 394,829.

*To all whom it may concern:*

Be it known that I, HARRY R. TRAPHAGEN, a citizen of the United States, residing at Rockford, in the county of Winnebago and State of Illinois, have invented certain new and useful Improvements in Reversible Harrows, of which the following is a specification.

This invention pertains in general to agricultural implements, and has more particular reference to what is known as a reversible harrow, so called because it is convertible for the purpose of harrowing and also for cultivating.

One of the primary objects of this invention is to provide an implement having such novel structural characteristics as to enable its use for the purpose of both harrowing and cultivating. To this end, I have provided a disk implement, the gangs of which are adapted to be reversed so as to turn the soil inwardly or outwardly, as the occasion may require.

Another object is to provide an improved connection between the disk gangs and the main frame by means of which the frame may be positioned at different elevations according to the particular use of the implement. That is, for harrowing and ordinary cultivation of small plants the frame would be disposed in its lowermost position, and for the cultivation of taller plants the frame would be raised to an elevated position so as not to injure the plants.

My invention also contemplates the provision of a connection between the disk gangs and the main frame which shall permit of angling the gangs about horizontal axes to accommodate them to the inclined sides of the ridges. This makes the implement universally applicable for either cultivating or harrowing both level and ridged fields.

A still further object is to provide an implement embodying the characteristics described, which shall be constructed in such simple and practical manner as to enable production at comparatively low cost.

Other objects and attendant advantages will be appreciated as the invention becomes better understood by reference to the following description when considered in connection with the accompanying drawing, in which—

Figure 1 is a plan view of a disk implement embodying my invention;

Fig. 2, a side elevation of the implement; and

Fig. 3, a rear fragmentary view illustrating the connection between one of the disk gangs and the main frame and showing in dotted lines the frame in an elevated position.

This implement embraces, generally stated, a pair of disk gangs 6 and 7, which support a main frame 8, to which is connected a driver's seat 9 and a pole 11, or any suitable draft attachment, these reference characters being applied generally. The frame and likewise the disk gangs may be of any suitable or preferred construction, consistent with the invention. In the present instance, the frame is formed of an angle bar 12 having rearwardly turned ends forming sides 13, which are joined by upper and lower rear angle bars 14 and 15 respectively, the latter being held in spaced relation, so as to afford passage therebetween of certain bolts which will be mentioned hereinafter with reference to the connections between the frame and disk gangs.

Each disk gang may include any suitable number of disks, which in practice range from three to five in an implement of this particular type. As shown in Fig. 3, the disks 16 are secured to a spool 17 which turns in bearings 18, the latter of which carry rigid upright bars 19 and 21 which are connected through means of bolts 22, to a cross head bracket 23. This bracket has a boss 24 in which is rigidly secured an upstanding post or spindle 25, upon which is vertically adjustable a sleeve bracket designated generally by character 26, which fits flat against the angle bars 14 and 15 and is secured thereto by bolts 27 and 28 which pass through the space 29 between said angle bars and are connected to cleats 31 which engage over the forward edges of the angle bars. The sleeve portion 32 of the bracket 26 is centrally parted for the reception of a collar 33 carrying a nut 34 adapted for clamping the collar to the spindle 25 for holding the main frame at any desired elevation, and at the same time permitting oscillation of the disk gang about the spindle axis for changing the angle of the gang with respect to the line of draft. It will be observed that the bolt 28 is disposed in an arcuate slot 35 in the bracket 26 and that upon loosening the bolts 27 and 28, said bracket may be adjusted upon and about the bolt 27 as a fulcrum to angle the disk gang with respect to the vertical as when accommodating the disks to the slope of a ridge. When the desired angle is obtained, the bolts 27 and 28 will be tightened, thereby securing the disk at the desired angle.

For the purpose of holding the disk gangs at the proper angle with respect to the line of draft and for changing this angle, I provide each gang with an adjusting lever 36 pivotally mounted on the main frame and co-operating therewith through the agency of a suitable notched segment and latch and connected to its respective gang by means of extensible links 37 and a bar 38, which latter is attached to the cross head bracket 23. Each gang is further connected to the main frame by means of an extensible draft bar 39, which is pivotally connected at its forward end to the angle bar 12 and at its rear end to the eye 41 formed integral with one of the bearing caps 18.

With the disk gangs in the full-line position shown in the drawings, the implement is adapted to harrow. For the purpose of cultivating, the links 37 and 39 will be disconnected from the disk gangs and the latter as units will be swung about substantially 180 degrees to position the concave sides of the disks inwardly, whereupon the link 37 will be attached to the end 38' of the bar 38, and the top bar 39 to the eye 41'. By this arrangement, the soil will be turned inwardly toward the plants, and the proximity of the disks thereto may be determined to suit the particular requirements by adjusting the bracket 26 inwardly or outwardly on the main frame. In practice three or four disk gangs are best suited for the purpose of cultivation. When the plants are small, the implement may be used with the main frame in its lowermost position, but for later cultivation such as required for corn, it is necessary that the main frame shall be elevated so as not to injure the plants. To this end, the frame 8 may be raised to an elevated position on the spindles 25 through means of the set collars 33, the adjusting link 37 and draft bar 39 being correspondingly lengthened as will be obvious.

From the foregoing it will be manifest that I have provided an implement of exceptionally few parts which may be quickly and easily put in condition for any of a large variety of cultivating or harrowing purposes, it being especially noted that this may be done without the use of auxiliary brackets or other attachments, which are always liable to be misplaced or lost.

It is believed that this conveys a clear understanding of the objects prefaced above, and while I have illustrated and described but a single working embodiment of my invention, it should be understood that various changes might be made in the construction and arrangement without departing from the spirit and scope of the invention as expressed in the appended claim, in which—

I claim:

A reversible harrow adapted for both cultivating and harrowing operations, comprising a draft frame, a pair of disk gangs, one at each side of the frame, a cross-head bracket carried by each disk gang, an upright spindle of substantial length fixed to and carried by each cross-head bracket, a sleeve bracket vertically movable on each spindle, means for adjustably securing each sleeve bracket to the draft frame and permitting adjustment of the sleeve bracket about a fore-and-aft horizontal axis upon and with respect to the draft frame, a lever on the draft frame for each disk gang and connected to its cross-head bracket for angling the gang about its spindle axis, draft bars between the draft frame and disk gangs, means for securing the sleeve brackets in either an elevated or lowered position on their respective spindles for adapting the harrow to cultivating and harrowing operations, and means for adjusting the length of said lever connections and said draft bars in accordance with said elevation adjustments of the spindle brackets.

HARRY R. TRAPHAGEN.